(12) United States Patent
Rönneke

(10) Patent No.: US 8,068,422 B2
(45) Date of Patent: Nov. 29, 2011

(54) ARRANGEMENT AND METHOD RELATING TO HANDLING OF IP TRAFFIC

(75) Inventor: Hans Bertil Rönneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 484 days.

(21) Appl. No.: 11/995,281

(22) PCT Filed: Jul. 14, 2005

(86) PCT No.: PCT/EP2005/007646
§ 371 (c)(1),
(2), (4) Date: Jun. 2, 2009

(87) PCT Pub. No.: WO2007/006332
PCT Pub. Date: Jan. 18, 2007

(65) Prior Publication Data
US 2011/0090792 A1   Apr. 21, 2011

(51) Int. Cl.
*H04L 1/00* (2006.01)
*H04L 12/66* (2006.01)
*H04J 3/16* (2006.01)
(52) U.S. Cl. .......................... 370/235; 370/353; 370/465
(58) Field of Classification Search .................. 370/235, 370/352, 401, 465
See application file for complete search history.

(56) References Cited

U.S. PATENT DOCUMENTS

| | | | |
|---|---|---|---|
| 6,680,952 B1 * | 1/2004 | Berg et al. ..................... | 370/467 |
| 7,042,843 B2 * | 5/2006 | Ni ................................. | 370/231 |
| 7,346,047 B1 * | 3/2008 | Berg et al. ..................... | 370/352 |
| 2002/0122387 A1 * | 9/2002 | Ni ................................. | 370/231 |
| 2003/0012180 A1 * | 1/2003 | Donahue et al. ............... | 370/352 |
| 2004/0213265 A1 * | 10/2004 | Oueslati et al. ........... | 370/395.42 |
| 2004/0248583 A1 | 12/2004 | Satt et al. | |
| 2005/0050246 A1 | 3/2005 | Lakkakorpi et al. | |
| 2007/0014276 A1 * | 1/2007 | Bettink et al. ................. | 370/351 |
| 2007/0297329 A1 * | 12/2007 | Park et al. ..................... | 370/230.1 |
| 2007/0298788 A1 * | 12/2007 | Corson et al. ................. | 455/433 |
| 2009/0201808 A1 * | 8/2009 | Bettink et al. ................. | 370/230 |
| 2010/0027548 A1 * | 2/2010 | Khan et al. ................. | 370/395.1 |
| 2010/0265834 A1 * | 10/2010 | Michaelis et al. ............ | 370/252 |

FOREIGN PATENT DOCUMENTS

EP             099674 A        5/2000

* cited by examiner

Primary Examiner — Andrew Lee
(74) Attorney, Agent, or Firm — Roger S. Burleigh

(57) ABSTRACT

The present invention relates to an arrangement for controlling communication of data packets through one or more communication networks or network domains. It comprises means for identifying real-time or non-bursty data packet traffic, for separating real-time data packet traffic from bursty data packet traffic, for controlling the admission of real-time data packets and it further comprises or communicates with means for keeping information about the amount of real-time data packet flows that is admissible and for keeping information about current number of admitted and/or non-admitted real-time data packet flows. Means are also provided for establishing whether a packet or packets of a real-time data packet flow is/are admitted or not, such that generally all packets of a real-time IP data packet flow either can be admitted or rejected.

17 Claims, 12 Drawing Sheets

| EXT. FWD. TABLE | | | | |
|---|---|---|---|---|
| DEST./ SOURCE/ PROTOCOL/ DEST. PORT/ SOURCE PORT (5-TUPLE) | GRANT/ REJECT | PACKET COUNTER | PREVIOUS PACKET COUNTER | TIMESTAMP |

Fig. 8

ARRANGEMENT AND METHOD RELATING TO HANDLING OF IP TRAFFIC

This application claims the benefit of PCT Application No. PCT/EP2005/007646, filed Jul. 14, 2005, the disclosure of which is fully incorporated herein by reference.

FIELD OF THE INVENTION

The present invention relates to an admissibility control arrangement for controlling communication of data packets in a data communication network comprising a number of communication networks and/or network domains. The invention also relates to a method for controlling communication of data packets in a communication network consisting of one or more networks or network domains.

STATE OF THE ART

Today the traffic in IP networks and Internet to a large extent consists of data traffic with a bursty character, also denoted self-similar, e.g. from web-browsing, e-mails, file transfers etc. Mechanisms are known and implemented for the control of bursty traffic, i.e. when there is too much, Such known mechanisms involve concepts such as buffering, congestion packet drop, back-off/TCP (Transmission Control Protocol) flow control etc. For so called bursty traffic, there are very large variations as to the amount of traffic from time to time, from minute to minute, from second to second and from tenth of second to tenth of second etc. Bursty, self-similar, traffic can be very hard to control since there may be such large differences from one point in time to another. Therefore quite harsh mechanisms are implemented for congestion control as referred to above, consisting in for example simply dropping packets at congestion and TCPs back-off to momentarily half the traffic if a packet drop is identified. So far such methods have been the only mechanisms capable of handling the harsh nature of bursty self-similar traffic.

However, today telecommunication and data communication converge more and more and an increasing part, or even a major part, of the traffic comprises Voice over IP, video over IP and other similar traffic. Such traffic types have in common that they are not bursty but consist of a comparatively steady flow of IP packets transmitted at a rather constant bitrate. Often these kinds of traffic have to meet requirements typical for real-time traffic, such as for example a low delay, a low jitter etc.

For real-time traffic the mechanisms that are known, as discussed above, and which are used for controlling bursty traffic are generally not applicable. Instead other types of mechanisms are required. Known mechanisms used for the control of real-time traffic are methods based on DiffServ, IntSery (e.g. RSVP Resource Reservation Protocol which is an IETF-protocol), Admission Control, monitoring of traffic and resources, network dimensioning, over-provisioning etc. Known admission control mechanisms involve signalling between nodes or between a user equipment (UE) and the network. The RSVP signalling protocol can for example be integrated with an admission control request. For a good end-user perception of a real-time service based on IP, it is necessary that the involved IP flows are maintained with a minimum of disturbances (i.e. lost packets, delay variation/jitter, etc) throughout the whole session. Moreover it is very important that the flows are maintained undisturbed end-to-end which might be the most serious problem for example due to the fact that the path of an IP flow often involves several network domains run by different operators. So far it has not been possible to find and agree on a method or set of methods within telecommunication/data communication through which a desired end-to-end QoS can be obtained. Some methods can not be used within large networks and/or can not give full guarantee as to the necessary extent or they become too complex and costly to implement and/or operate etc.

SUMMARY OF THE INVENTION

What is needed is therefore an arrangement through which real-time traffic or non-bursty traffic can be controlled. Particularly an arrangement is needed through which real-time or non-bursty traffic can be controlled end-to-end or through which an end-to-end Quality of Service (QoS) can be provided. Particularly an arrangement is needed through which a good end-user perception of real-time services based on IP can be provided. Moreover an arrangement is needed through which real-time IP flows can be maintained with as little disturbances as possible, for example lost packets, delay variation/jitter etc. throughout the whole of a session. Particularly an arrangement is needed through which the flows can be maintained undisturbed end-to-end. Particularly an arrangement is needed through which end-to-end QoS can be provided irrespectively of the size of the networks or network domains and through which QoS can be guaranteed to a desired extent. In addition thereto an arrangement is needed which is easy to implement and operate and which also does not involve high costs to implement and operate and which can be implemented despite there being different operators involved along the path of the IP flows. Particularly an arrangement allowing improved admission control, Call Admission Control (CAC), here a mechanism to protect a network from being overloaded, which is improved, is needed. Further yet an arrangement is needed which is compatible with existing IP technology. Still further an arrangement is needed which allows networks to be upgraded stepwise.

A method through which one or more of the above mentioned objects can be achieved is therefore also needed.

Therefore an arrangement, or an admission control arrangement, as initially referred to is provided which comprises identifying means for identifying data packets belonging to real-time or non-bursty flows. The identification may be carried out in many different ways and for example may real-time data packets be identified or data packets belonging to bursty traffic, or both.

It further comprises separating means for separating real-time data packet traffic from bursty data packet traffic, and control means for controlling the admission of real-time data packets comprising or communicating with means for keeping information about the amount of real-time data packet flows that is admissible, e.g. of allowed and current number of admitted and/or non-admitted real-time data packet flows. Such means may be combined, integrated or separate. They may also be seen as forming part of the control means, or separate from the latter.

Means are further provided, included in the control means or separate, for establishing whether a packet or packets of a real-time data packet flow is/are admitted or not, such that generally all packets of a real-time IP flow either can be admitted or rejected.

In one embodiment the separating means are adapted to physically separate real-time or non-bursty traffic and bursty traffic from each other. In a particular embodiment the separating means are adapted to separate real-time IP flows and bursty IP flows by using separate links or separate interfaces or separate routers, separate nodes etc.

In another embodiment the separating means are adapted to virtually or logically separate real-time, non-bursty data packet traffic from bursty traffic.

In one embodiment real-time traffic and bursty traffic are separated from one end point to another end point. In another embodiment real-time traffic and bursty traffic are separated at least from one aggregation node, e.g. an aggregation router, to another aggregation node or to an end point or vice versa.

Particularly marking means are provided (internally or externally) for marking of IP packets, e.g. diffserv DSCP marking may be implemented, i.e. DiffServ classes (DSCPs) and associated scheduling or queues, allowing logical separation. Particularly a DiffServ scheduler is used for marking/separating real-time packets from packets classified as bursty traffic and common nodes, links, routers etc. may be used for real-time as well as for bursty traffic.

QoS class of PDP contexts may in 3GPP networks or network domains be used as a basis for separation. If separation is carried out based on PDP context class, particularly IP packets of classes conversational or streaming are defined as real-time packets whereas packets of class interactive and background are seen as bursty traffic.

Particularly the identifying means are adapted to identify packet data flows based on destination address and source address. In an alternative implementation the identifying means are adapted to identify packet data flows based on destination address, source address and protocol identification, i.e. the so called 3-tuple. The identifying means may also be adapted to identify packet data flows based on destination address, source address, protocol ID, destination port and source port, e.g. the so called 5-tuple, or on more information, 7-tuple or higher.

The control means comprise or communicate with flow information holding means for holding information about real-time IP flows and further comprises or communicates with flow admittance capacity indication means for setting a flow limit indicating the maximum number of allowable flows for a router, a node, an interface or a link etc. Particularly the flow information holding means comprise separate information holding means or the flow information holding means may alternatively be implemented as an extended forwarding table.

Preferably the control means are adapted to, for each arriving packet, check if it belongs to a current admitted flow, and to, if it does not, verify with the flow admittance capacity indicating means if a new flow can be accepted, and making an entry about the new flow in the flow information holding means indicating at least that it can be admitted. Particularly an indication is provided in the flow information holding means relating to a non-admitted packet, e.g. a disallowed or rejected packet, marking as well. Even more particularly the indication means are adapted to provide a disallowed packet marking only for the first packet of a non-admitted flow subsequent packets being silently discarded by the control means. Alternatively also the first packet may be discarded silently. The control means may comprise counters and, for each entry in the information holding means for each forwarded packet of an allowed flow, the counter is incremented or stepped up, said counter further being adapted to indicate the end of a flow e.g. in such a way that when there has not been transmitted any packet for a given time period, this is taken to indicate that there are no more packets in the particular flow. In order to avoid lack of transmitted packets in one of the directions as an indication of end-of-flow, so called refresh packets may be sent with a given periodicity, i.e. if there is silence either in one direction or in the other. Particularly, for each entry in the information holding means, a time stamp is saved in the entry, and upon lapse of a predetermined time period, the entry is removed for a disallowed flow. Alternatively it comprises second counters, whereas a second counter is stepped up each time a packet is received for a respective disallowed or a non-admitted flow, and the control means are adapted to remove a non-admitted entry when the second counter value for a non-admitted flow has been unchanged for a predefined period of time, thus allowing that call to be tried to be established again.

In one embodiment the control means are adapted to return an indication packet, e.g. an ICMP packet, to the sending host establishing that a flow cannot be admitted, e.g. after checking with the resource capacity indicating means. In an alternative embodiment no action is taken by the control means to inform the sending host. The source host then has to use other means to identify that the flow has been blocked (i.e. not admitted), for example sending initial probing packet(s) from source to destination and back. Particularly some probing packets are sent, hence increasing the degree of certainty as to whether there are resources available or not.

In one embodiment the flow capacity indicating means are comprised by the control means, i.e. comprise internal flow limit setting means, said flow limit setting means being adapted to measure the utilization of different resources in the arrangement or in the node in question. In alternative implementations the capacity indicating means are provided externally but in communication with the arrangement, e.g. in a management system or an operation and maintenance system, or whereby the flow limit setting will be based on externally collected performance or usage data information. In still another implementation an arrangement is adapted to set flow limits through external as well as internal setting.

In a particular implementation the arrangement is provided in a router, e.g. an edge router, an access router or in a GGSN (Gateway GPRS Support Node), a CGSN (Combined GPRS Support Node), an SGSN (Serving GPRS Support Node) a MGW (Media GateWay) or an SBG (Session Boarder Gateway), or in one or more of the above mentioned node types, or other having similar functionalities.

The invention also relates to a system comprising a number of arrangements having the features of any one of embodiments discussed above. Admission control arrangements may be comprised or implemented in a number of access routers, edge routers, conventional routers or all routers, GGSNs, MGWs or SBGs etc.

The invention therefore also suggests a method as initially referred to which comprises the steps of; identifying data packets of real-time or non-bursty IP data flows; separating real-time IP data packet traffic from bursty data packet traffic; establishing in an arrangement in or associated with a node, the admissibility of IP data packet flows by establishing or estimating the amount of data packet flows that can be handled and setting a corresponding limit; establishing in the admissibility control arrangement, the number of current, admitted, data packet flows; detecting whether an arriving data packet belongs to a current flow or if it is a packet belonging to a new data packet flow; accepting and forwarding data packets belonging to current flows or rejecting the flow and (silently) discarding packets; examining, for a packet belonging to a new data packet flow, whether there is capacity left for the new flow and, if yes; admitting or forwarding the data packet; if not, rejecting the flow and discarding the data packet.

Preferably the detecting step further comprises; detecting if an arriving packet belongs to an already rejected or non-admitted flow, i.e. if it is not the first packet that is rejected of a data packet flow; if yes, discarding the packet. In an advantageous embodiment, the method comprises the step of; returning an indication message, e.g. an ICMP packet, if a packet is the first packet of a data packet flow that is rejected, to a preceding node etc. or to the source from where the packet originated, or the host.

In a particularly advantageous implementation the separating step comprises; separating packets belonging to real-time flows from packet belonging to bursty data packet traffic physically, e.g. by separation on different nodes, routers, links etc, at least in required part(s) of the network(s) or network domains. Particularly, in another implementation, the method comprises the step of; separating packets belonging to real-time traffic from packets belonging to bursty data packet traffic logically or virtually while still using the same links, nodes, routers etc. for both kinds of traffic. In one implementation the DiffServ Code Point is used for separating real-time traffic from packets belonging to bursty data packet traffic.

Particularly the separation steps comprises; separating real-time data packet flows from bursty data packet traffic from one end-point to the other end-point or; separating real-time data traffic from bursty data traffic at least from one aggregation node to another. In a particular implementation the method comprises the step of separating, in the 3G-domain, real-time traffic from bursty traffic based on PDP context QoS class, e.g. separating conversational and streaming class traffic from interactive and background PDP context type wherein conversational and streaming comprises real-time traffic.

In a particular implementation the flow identifying step comprises; identifying real-time data packet flows using at least destination address and source address. As referred to also the so called 3-tuple or the 5-tuple or even higher tuples may be used but also other relevant information.

Particularly the method comprises the steps of; making an entry in a flow information holding means for each new real-time data packet to keep track of at least all current real-time flows; stepping up a counter for each packet that arrives belonging to a current flow. In a particular embodiment the method further comprises the step of; making an entry in the flow information holding means also for each packet belonging to a non-admitted real-time data packet flow. Even more particularly the method comprises the step of; saving a timestamp in each entry created in the information holding means. In an alternative embodiment the method comprises the step of; stepping up a counter for each packet of rejected or disallowed flows as well. Particularly the method may comprise the step of; setting the flow limit corresponding to the amount of data packet flows that can be handled internally in the arrangement e.g. by measuring resource utilization, or by means of information received from an external system, e.g. a management system or an operation and maintenance system, or through a combination of both, i.e. internal in combination with external setting. If timestamps are used for both allowed and on disallowed flows, the timestamps may be used to remove the entry upon lapse of a predetermined time period after no more packets have been received for disallowed flows, in order to allow for such a flow to be established again, e.g. through indication of whether there are, at a later occasion, resources available through comparison between the set flow limit and the number of current flows at that point in time. For admitted flows, the timestamp is used to enable removal of the entry in the flow information holding means after lapse of a given time period e.g. with no packets to release the resources. It may also merely be used for performance monitoring purposes, e.g. to know the average length of calls or flows. If a counter is used for disallowed flows as well, this is an implementation alternative to the timestamp implementation. Then the counter (for a disallowed flow) is increased at packet arrival and after being unchanged for a predetermined period of time, the entry is removed and then a new attempt may be done as discussed above. In that case no timestamp is required and less memory is used for each flow.

BRIEF DESCRIPTION OF THE DRAWINGS

The invention will in the following be further described, in a non-limiting manner, and with reference to the accompanying drawings, in which:

FIG. 8 shows an example of a flow information holding means implemented as an extended forwarding table.

BRIEF DESCRIPTION OF THE DRAWINGS

First, the difference between bursty traffic and non-bursty traffic will be briefly discussed. Bursty traffic is traffic that is said to be self-similar to its nature. This means that there are very large variations in the amount of traffic from time to time, from minute to minute, from second to second and from tenth of second to tenth of second etc. It can be very hard to control bursty self-similar traffic since there may be such large differences from one point in time to another. As discussed above the mechanisms that can be used to control bursty traffic are not applicable for the control of real-time non-bursty traffic. Real-time traffic or non-bursty traffic is mostly the result of the transfer of audio and/or video from one location to another, using IP technology for the transfer. It is coded at one location and the coded information is put into IP packets and sent to the next location where it is decoded and converted into audio/video again. The audio/video transfer may either be unidirectional or bidirectional.

Packets are produced in the sending end at a constant or almost constant packet rate. A real-time flow therefore has a distinct start, a period when the session is ongoing, and a distinct stop after which no more packets are sent. In that respect real-time traffic is completely different from non-real-time, bursty traffic. That is the reason why different mechanisms are required for the handling of real-time traffic.

Due to the way it is generated, real-time traffic has the characteristic that each flow does not consist of only one or a few packets, but of a very large number of packets sent over a longer period, often several minutes. Hence, typical for real-time traffic it is that it has a long duration, and that it has a constant or near constant bitrate. This means that there are fewer new flows per second to handle and fewer flows terminating per second that are to be handled. Real-time flows do also have quite high bitrates which means that there are fewer simultaneous flows on an interface before the upper limit of the interface is reached.

Figure 1:
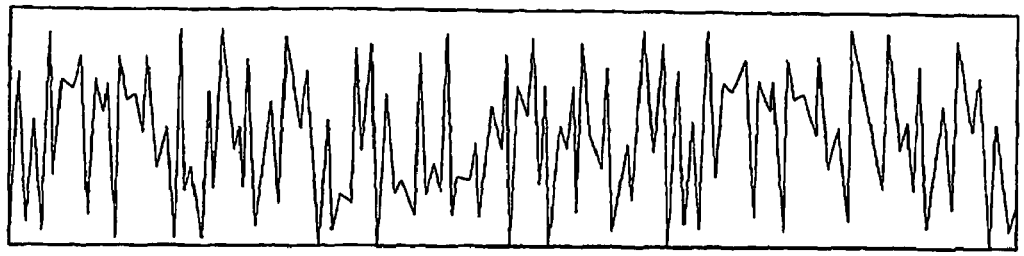
FIG. 1 shows an example of bursty traffic on a link/trunc.

FIG. 1 very schematically illustrates bursty, self-similar or non-real-time traffic on a link/trunc.

Figure 2:
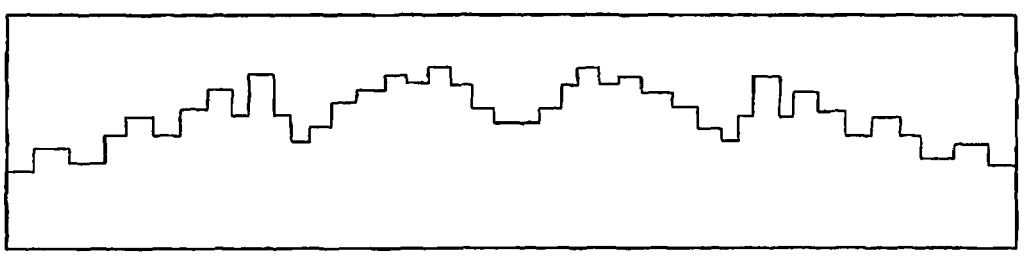
FIG. 2 shows an example of non-bursty or real-time traffic on a link/trunc.

FIG. 2 shows an example on real-time (non-bursty) traffic on a link/trunc.

The main idea of the inventive concept is to keep the bursty and the non-bursty traffic separated (physically or virtually) at least through a part of a network or through a network domain etc. and to take advantage of the fact that it is separated to apply specific methods on the real-time, non-bursty traffic. Actually, even if the flows consist of IP packets, statistical methods used for handling telephony traffic in traditional networks could, if modified, be applied. According to the arrangement it is for example, in a real-time node, possible to calculate the probability of blocking given a certain traffic and capacity, or vice versa, calculate the needed capacity given a certain traffic and desired blocking probability. This means that a mechanism like (distributed) autonomous flow-based admission control according to the present invention is possible to apply. All cases referred to above are based on the fact that all the IP flows on a link or in a router etc. has a distinct start, an intermediate period with constant or near constant packet rate, followed by a distinct stop.

In one implementation of the present invention an admission control arrangement is provided in some of the routers or other nodes or arrangements along the end-to-end path to identify and keep track of all real-time IP flows. When a flow is identified, for example in a router, it is either admitted or rejected depending on the current resource situation in the router. If it is admitted, it remains admitted throughout the whole session or lifetime of the IP flow. If however, a flow was rejected instead, no packet in that flow is sent. In one implementation of the invention, as will be further described below, an indication packet, e.g. an ICMP (Internet Control Message Protocol) message may be sent back indicating lack of network resources. In that way a host, for example a UE (User Equipment) can easily reserve resources along an end-to-end path just by starting sending IP packets, either a complete flow or a single packet etc. If the packet or the packets gets through, resources are reserved in all domains end-to-end. If, however, e.g. an ICMP packet is returned indicating that no packet traffic gets through, there were not enough resources along the end-to-end path and the call was blocked. Alternatively no indication is provided even if a packet is not admitted and an indirect detection that a flow has been disallowed or rejected hence being implemented. Thus, direct (indication message or similar) or indirect awareness-making may thus be implemented as to whether a flow is admitted or not. Additionally, when indirect awareness-making is used, a mechanism using initial probing packets sent back and forth between sender and receiver may be used.

Having state information per flow in a router or generally in an arrangement according to the invention, which may be arranged in a router, a GGSN, a Media Gateway etc., is normally not realistic due to the very large amount of traffic that is needed to be handled in real-time. But due to the fact that, according to one embodiment the present invention, only real-time traffic enters an interface, this gets possible. As referred to above, each real-time flow comprises a very large number of packets sent over a comparatively long period, often several minutes which means that the flow has a long duration and also an almost completely constant bitrate which, as referred to above, has as a consequence that there are fewer new flows per second to handle and fewer flows terminating per second to handle. Since the bitrates are high, the number of flows to handle simultaneously is also lower on an interface before the upper limit of the interface is reached. Hence, due to the fact that real-time traffic is kept separate from non-real-time traffic, (virtually or physically) as will be more thoroughly described below, this allows the use of new QoS (Quality of Service) such as autonomous flow based admission control.

Figure 3:
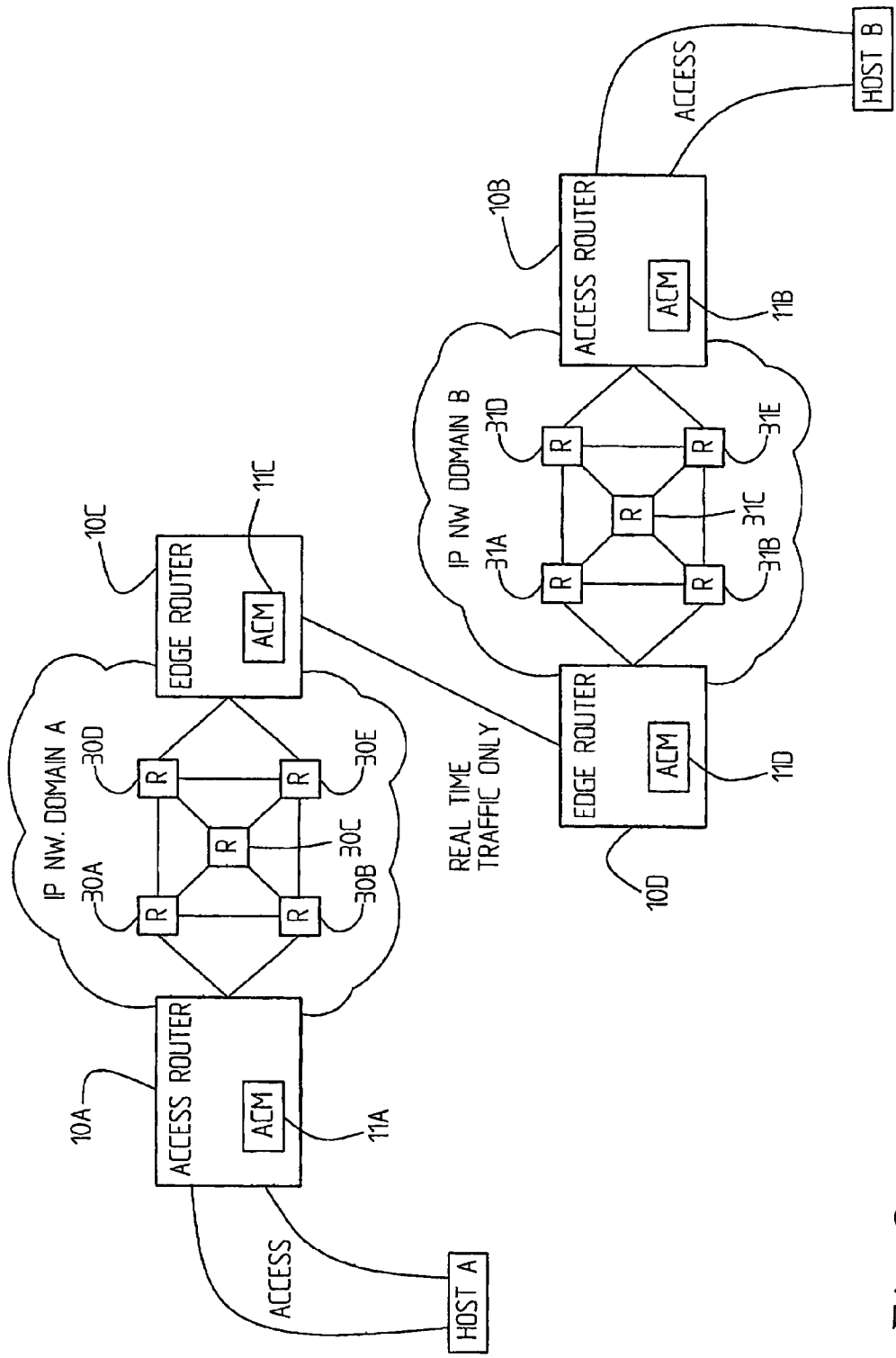
FIG. 3 shows an example of networks where admissibility control arrangements according to the inventive concept are implemented in edge routers.

FIG. 3 schematically illustrates a number of networks or IP network domains in which the inventive concept is applied. It comprises a first IP network domain A and a second IP network domain B. Admission control arrangements 11A, 11B, 11C, 11D are implemented in an access router 10A over which an host A can access and in an access router 10B providing access for host B. The access routers 10A, 10B comprise admission control arrangements 11A, 11B, merely schematically illustrated. Admission control arrangements 11C, 11D are also implemented in edge routers 100, 10D. The IP network domains A, B also comprise, each, a number of routers 30A-30E and 31A-31E respectively. IP network domains A, B are networks with separated real-time traffic. The link between the edge routers 100, 10D only is used for transfer of real-time traffic.

In an admission control arrangement, e.g. as disclosed schematically in FIG. 3, the flows are separated. According to a first embodiment the admission control arrangement here comprises means for physically separating the flows by using different links, interfaces, routers etc. for the real-time traffic. The traffic is then kept separated from one end to the other, or alternatively, in other embodiments from an aggregation router in one end to an aggregation router in the other end or at least to an aggregation router in either end respectively. However, this assumes that the access between the host and the aggregation router it is connected to, is congestion free. Separation of traffic can be done in different manners. It may for example be based on IP packets being marked, e.g. by means of so called diffsery DSCP marking. In a 3GPP (Third Generation Partnership Project), the separation can be based on QoS class of the PDP context. IP packets of context classes conversational and streaming are then e.g. classified as real-time IP traffic, whereas IP packets of class interactive and background are defined as bursty traffic. If the separation is not perfect or if the separation algorithms that are used are not entirely perfect, and some bursty IP flows slip into the real-time traffic, the inventive concept will still function unless the number of erroneous flows becomes large in which case a degradation of network utilization of resources may occur. In an alternative embodiment the separation between real-time traffic and non-real-time traffic is performed logically or virtually. For example an autonomous flow admittance control may be implemented and integrated with a DiffServ scheduler and where it is only operating on packets classified as real-time packets. In such embodiments it is possible to use common links and common equipment for both types of traffic.

In FIG. 3 the autonomous admission control arrangements 11A, 11B, 11C, 11D according to the present invention will be illustrated as provided in routers, e.g. access router 10A, 10B and edge router 10C, 10D. The functioning is similar irrespectively of where the admission control arrangements according to the present invention are implemented, i.e. in a router or in some other nodes, or devices etc.

First it is supposed that a router (here) in which the arrangement is implemented knows or is informed e.g. by means of the control arrangement its own maximum limit on the amount of flows that it can accept. It then keeps track of all ongoing flows in a flow information holding means (not shown in FIG. 3) which may be implemented as separate information holding means or for example in the form of an extended forwarding table or similar. For each packet that is forwarded by for example router 10A, it is performed a check in the flow information holding means, e.g. in the extended forwarding table (not shown in FIG. 3) if a flow already has been accepted. If, not, and the packet is the first packet of a new flow, a check is done to see if there are enough resources to accept another flow. How the limits are set will be discussed below in the application, it can be done in different manners. If it is the first packet of a new flow, a new entry for the flow is inserted into the flow information holding means, e.g. the extended forwarding table. If it is detected that there are not enough resources available, the packet is dropped. In one embodiment an ICMP packet is returned to the source indicating lack of network resources and, in this embodiment, a new entry is inserted for the flow into the flow information holding means. Such an entry is marked as a disallowed or rejected flow. If there are subsequent packets of a disallowed flow, preferably they are just silently discarded, without returning any ICMP packet, if such an implementation is used, in which case only the first packet of a flow triggers the sending of an indication message in order not to flood the network with ICMP packets or similar. However, in alternative embodiments no ICMP packets or similar are returned but an indication is provided indirectly e.g. using initial probing packets sent between the two hosts.

Preferably each time a packet is forwarded, a counter is incremented for its entry in the flow information holding means. That counter is used to identify when a flow has stopped as will be further described below. Each time an entry is created in the flow information holding means, particularly in the extended forwarding table, a timestamp may be saved in the entry. For disallowed flows such timestamp is used to remove the entry after the lapse of a given time period, i.e. in order to allow the flow to be established again and to perform further attempts to see if there are enough resources at a later stage. For admitted flows the timestamp is used for performance monitoring purposes, e.g. in order to know the average length of calls or flows.

In an alternative implementation second counters are used, not only for allowed flows but e.g. also for disallowed flows. For allowed flows the second timer makes detection of stopped flows more efficient. For disallowed flows the second timer may in an alternative implementation be used to count the blocking time. In that manner the timestamp can be left out since it is not of any particular use for, for example allowed flows. In that manner the memory consumption per flow is reduced which is advantageous.

The control means also comprise (or communicate with) flow identification means. A flow can be identified in many different manners. In one implementation destination address and source address are used to identify the respective flows for purposes of autonomous flow based admission control according to the present invention. In another implementation destination address, source address, protocol ID, i.e. the so called 3-tuple is used. In still another implementation destination address, source address, protocol ID, destination port and source port, i.e. the so called full 5-tuple is used for identification purposes. Also other implementations are possible.

As referred to above, information is needed in the arrangement, or the node etc. where it is implemented, about the maximum number of or the amount of real-time data packet flows that can be accepted, i.e. are admissible, as well as the number of current flows. The limit for the maximum number of flows that can be admitted for a router/interface/link etc. can be set in different ways. In a first embodiment the flow limit is set internally by measuring the utilization of different resources in the node itself. This is denoted internal setting of flow limits. Internal setting e.g. in a router, can be done in different ways. In one embodiment packet drops are monitored, means are provided for monitoring packet drops e.g. due to congestion in the router and the flow limit is set based on that. Then it will be the "hard" limit and the flow may not be increased more but rather set to a slightly lower value. In a preferred implementation, for a real-time router, monitoring means are provided such that it gets possible to stop new flows just before congestion arises, i.e. there are no packets lost. By knowing the maximum bandwidth of an interface or a link, measuring the totally used bandwidth and by counting the number of simultaneous flows, it is also possible to predict when the flow limit is reached. In still another implementation the flow limit is found through measuring other limiting factors such as CPU usage for forwarding hardware etc.

Even if flows in the IP domain can have different bitrates or packet rates, a relatively good prediction can be done by calculating the average bandwidth for current flows and then set the flow limit based thereon. Each new granted flow is then considered to have the average bitrate and some marginal is used, and with some marginal it is possible to, in each moment have a flow limit through which packet losses can be avoided.

Figure 4:
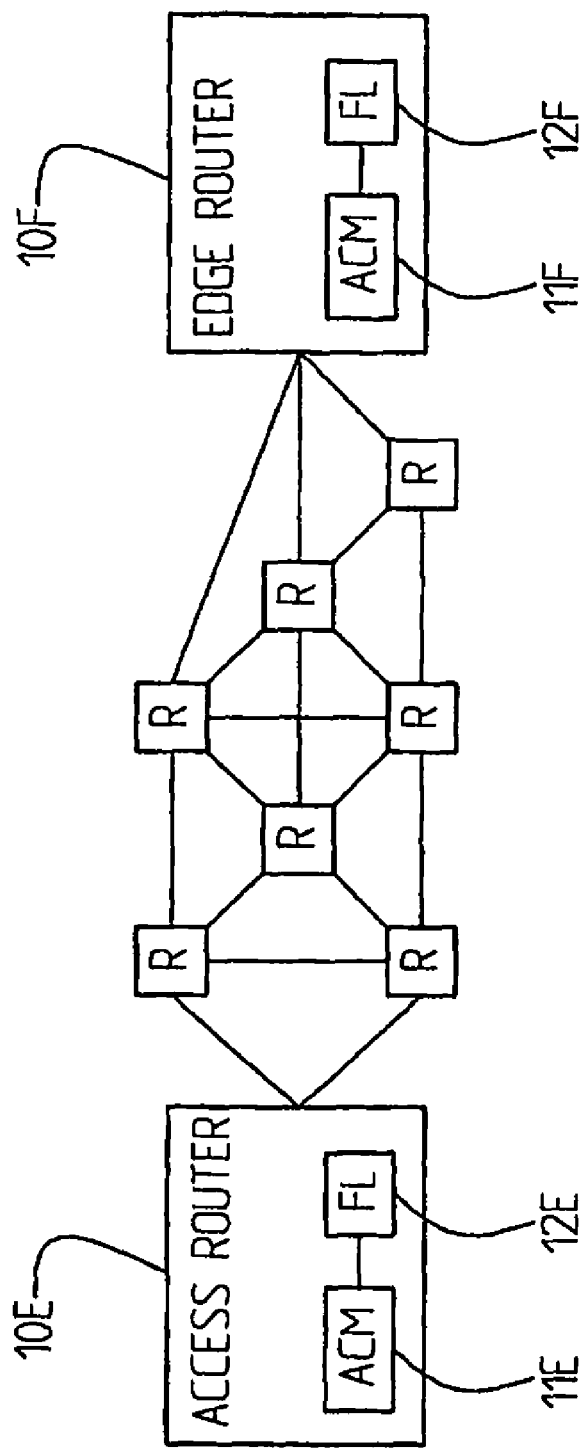
FIG. 4 shows an example of a network with admissibility control arrangements implemented in access and edge routers and which implement internal setting of flow limits according to one embodiment.

FIG. 4 shows an example of a network with admission control arrangements ACM 11E, 11F provided in access and edge routers 10E, 10F and wherein internal setting of flow limit is implemented as described above. This means that access router 10E comprises internal flow limit setting means 12E. Also edge router 1OF comprises internal flow limit setting means 12F. The network is hence dimensioned in relation to the capacity of the access/edge routers 10E, 10F. In normal operation there is no congestion. Thus, congestion in routers and devices inside the network can be avoided by dimensioning the network in relation to the flow limits set in the internal flow setting means 12E, 12F in the access and edge routers 10E and 1OF respectively at the access and edge. This means that the network is so dimensioned that it is capable to handle the known maximum traffic that can enter through the access/edge routers 10E, 10F. Such a network normally works without congestion. In case of link or node failure, manual resetting of flow limits in access and edge routers may be necessary in order to overcome the congestion situation. The network will then operate with reduced capacity. The resetting can also be handled in other manners and in an automatic manner etc. The invention is not limited to any particular way of resetting flow limits in case of failures.

Figure 5:
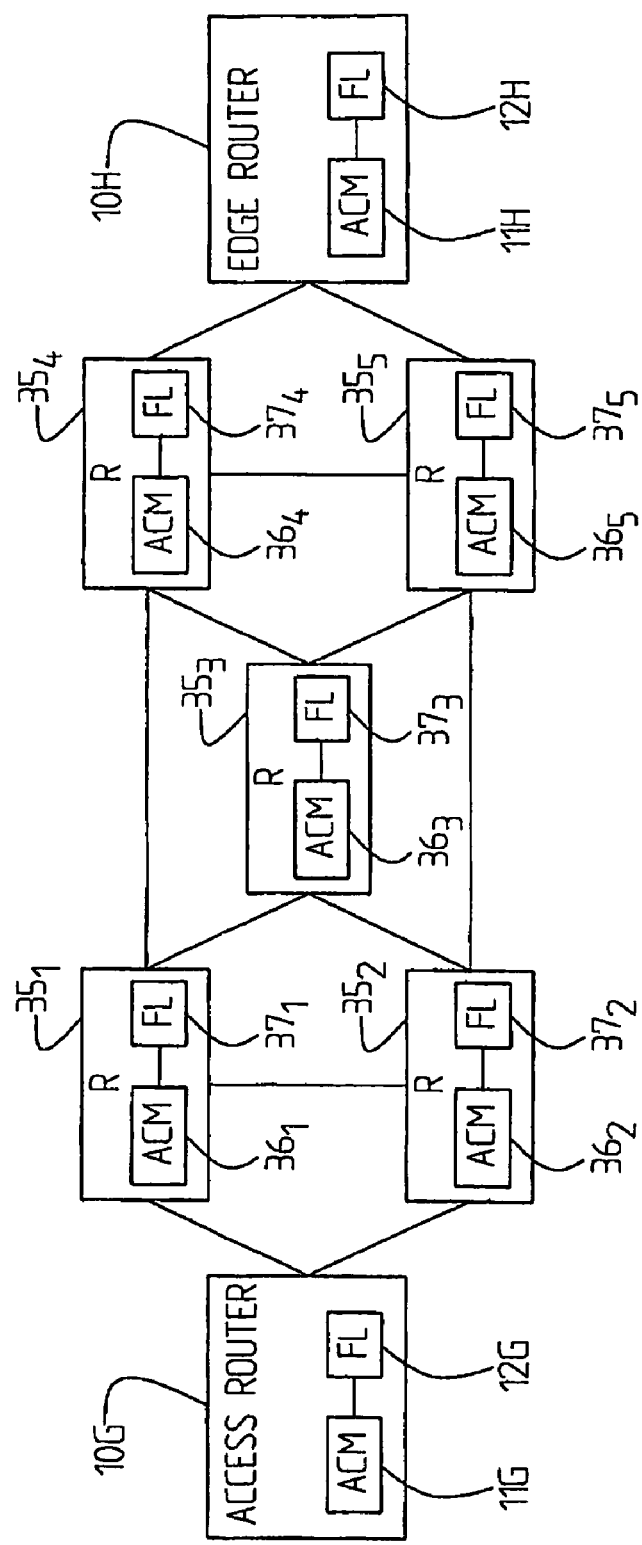
FIG. 5 shows an example of a network with admissibility control arrangements implemented in all routers and wherein internal flow limit setting is implemented in all these nodes.

FIG. 5 shows an implementation where admission control arrangements ACM 11G, 11H, $36_1$-$36_5$ are implemented in access router 10G and edge router 10H, but in addition thereto in all other routers $35_1$-$35_5$ in the network as well. In case of a network failure, in such an embodiment, congestion free operation will be regained automatically at a lower capacity level. Excessive flows will be stopped immediately when routed through their new paths.

In alternative implementations flow limits may be set, externally. An external setting may for example be manually configured into the node by an Operation and Maintenance operation system, or it may be set periodically from a management system of some kind, which e.g. may base the limit on some collected performance statistics in the network.

With a flow limit set externally, i.e. by an external arrangement, this may be done in different ways. If may be set to a fixed value by an O&M system. It may be set periodically from a management system or vice versa. Such a management system may collect performance statistics in the network, e.g. congestion situations, and based on that periodically or upon need calculate new flow limits for the routers, nodes or arrangements in the network comprising admission control arrangements according to the inventive concept.

Figure 6:
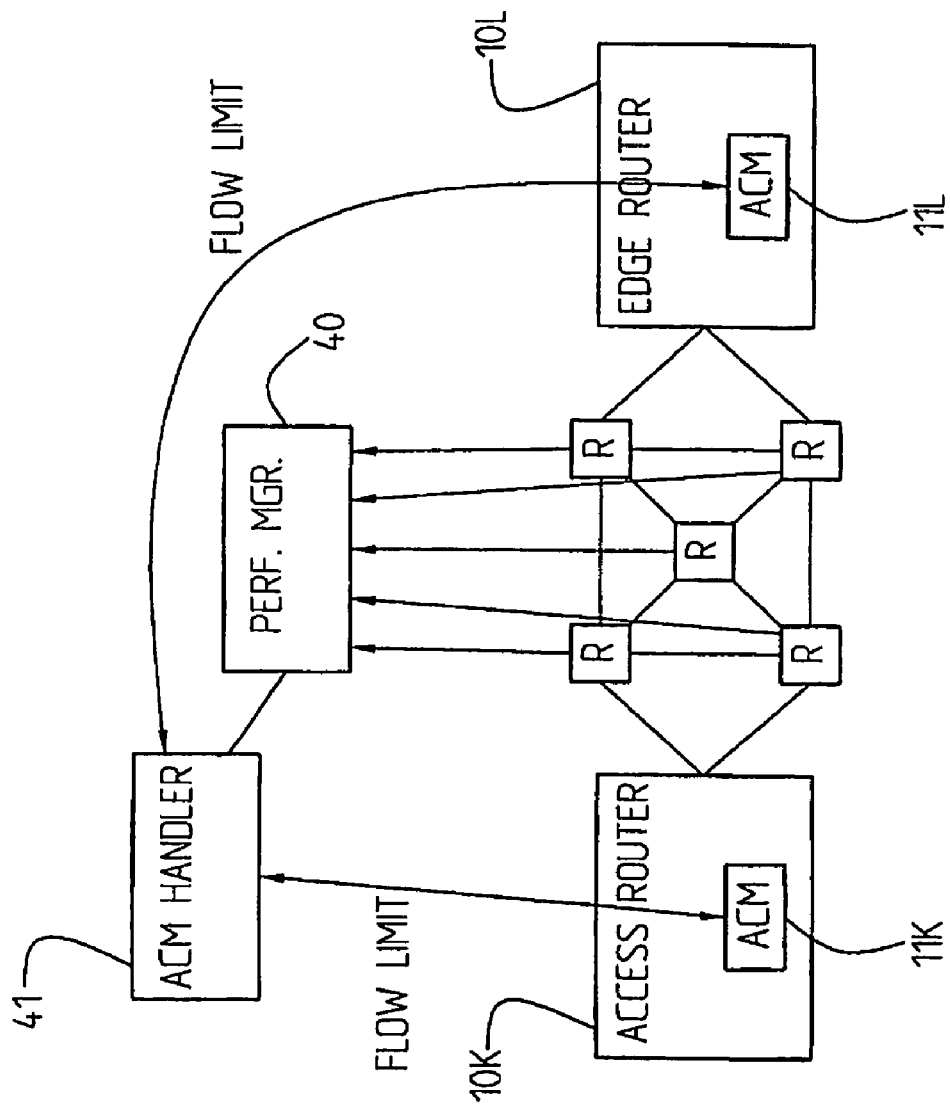
FIG. 6 shows an implementation according to the invention wherein admissibility control arrangements are implemented in access and edge routers, and wherein external flow limit setting is implemented.

In FIG. 6 an embodiment is illustrated of a network with an access router 10K and an edge router 10L and a number of "internal" routers simply denoted "R", wherein the flow limits are set externally and communicated to the access router 10K and the edge router 10L respectively. In this case it is supposed that the flow limits are set by a management system 40. The management system 40 continuously collects performance statistics indicating if congestion has occurred from routers, nodes and devices etc. in the network. Based on the collected figures, the flow limits for the access and edge routers 10K, 10L are periodically recalculated and then downloaded into the access router 10K and edge router 10L respectively. By having full control over how much traffic that is entering the network, it also gets possible to have full control over the congestion situation in the network. This is an advantageous implementation if only access and edge routers are equipped with admission control arrangement according to the present invention.

In an embodiment where all routers in the network are provided with admission control arrangements according to the present invention, the internal way of setting the flow limit might be the most appropriate. However, in any case every combination is possible and external setting may also be used. If all nodes or substantially all routers, (whichever the nodes or arrangements are), are equipped or provided with admission control arrangements or, if only access routers or only edge routers or MGWs or GGSNs or any other arrangements are equipped with admission control arrangements according to the present invention, it is also possible to implement external as well as internal setting, or a combination of both. For example some nodes/routers etc. may support internal setting, whereas other do not or it may be an optional feature (external and/or internal setting) in some nodes, routers etc. It may depend on type of node, router etc. if internal, external or a combination thereof is used.

As referred to above, if admission control arrangements are implemented in access and edge routers using external setting of flow limits based on performance statistics from other routers or nodes, congestion free operation will be regained automatically at a lower capacity level. A short period with congestion will occur before management systems will be able to react.

Generally there are no specific requirements on end-user hosts in order for them to be able to acquire end-to-end resources in a network implementing the inventive concept. In an advantageous embodiment, however, a more smooth interaction with the network can be achieved if an end-user host is provided with some specific behaviour, for example, comprising an ability to react appropriately to, for example, an ICMP message, if ICMP messaging is implemented when there is noted that there are no more resources that can take care of a new flow, or when resource reservation has failed. The end-user host should then immediately stop sending IP packets and let the end-user know that real-time communication is not possible at the moment, for example a message may be presented indicating "please try again later" or similar.

Another advantageous feature may be provided to give ability to start a real-time flow by sending a single or a few IP packets back and forth (a "probe") in order to reserve resources. That would tell the end-hosts whether there are resources in the network or not, and hence if a call (bi-directional flow) can be started. If the packet(s) of the probe gets back, resources are reserved for the flow. It should be clear that these features merely relate to specific advantageous implementations.

One implementation of such a probe consists of sending one or a few packets back and forth three times, a three-leg probe. That is, one end-host, e.g. the originating end-host, sends a few probing packets to the terminating end-host. The terminating end-host returns all probing packets to the originating end-host. When the originating end-host receives the returned probing packets, it knows that the network has resources for a bi-directional flow. Still the originating end-host does not know if a bi-directional flow is possible. The originating end-host does therefore also return the probing packets to the terminating end-host, i.e. the packets are sent a third time between the originating and terminating end-hosts. The originating end-host indicates in the probing packets that this is the second time it sends the probing packets. When the terminating end-host receives probing packets with such an indication, then it does also know that the network has resources for a bi-directional flow. Hence both end-hosts know that the call can be established.

Normally there is a problem for a router to keep state information on flow level in an IP network. However, through the introduction of the inventive concept it is normally sufficient to use or implement admission control arrangements in access routers and edge routers wherein the number of flows is limited as compared to in high capacity core routers. In some implementations or generally it is not necessary to introduce the admission control functionality into the very core of the network. In addition thereto, with the separation of real-time traffic and bursty traffic, the number of simultaneous flows in a router will be much lower. An estimation is that there will be 10 to 1000 times less flows during a certain time in a real-time only device. Of course the exact factor depends on network configuration, user profiles etc. It should however be clear, as discussed above, that the functionality according to the present invention also can be introduced in other routers or devices or nodes than access routers and edge routers. Among others due to the reasons stated above, it will be easier to keep state information in for example routers, but also other nodes or devices.

A router, or node or some other device or arrangement that is equipped with admission control arrangement functionality according to the present invention, also denoted Autonomous Flow Based Admission Control (AFAC), is in one embodiment dedicated for real-time traffic. In another embodiment it is at least able to handle the real-time traffic separately using separate links, connections, interfaces, CPUs or other hardware and software (in case a physical separation is implemented as discussed earlier in the application). In another embodiment a router, or a device etc. is capable to handle both real-time and bursty traffic. Then, however, it should also be so designed that an overload situation on the bursty side does not affect the real-time side of the router or whatever is the arrangement.

An arrangement according to one embodiment of the present invention will be illustrated with reference to FIG. 10 below.

However, an arrangement, here supposed to be a router, including the inventive functionality needs to have an information holding means as discussed above. In one embodiment it is supposed that it is an extended forwarding table which can hold entries, not down to host entries, but down to entries including both destination and source address, or whole 3-tuples or in some implementations even whole 5-tuples (destination and source address, protocol, destination and source port), or in other implementations even higher tuples.

Figure 7:
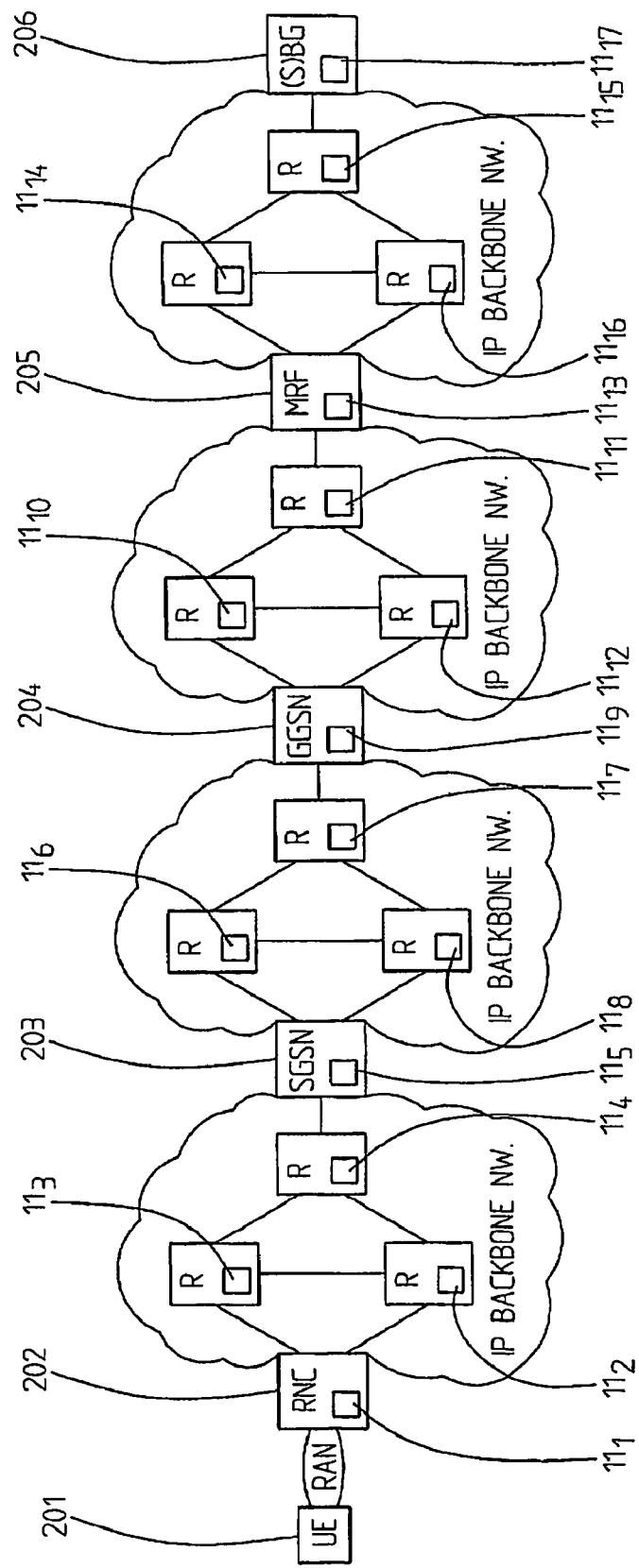
FIG. 7 shows an embodiment according to the invention in which admissibility control arrangements are implemented in GGSN, SGSN etc. in a 3GPP network domain.

FIG. 7 very schematically illustrates one implementation of the inventive concept in the 3GPP domain of a network. It should be clear that admission control arrangements $11_1$-$11_{17}$ may be provided in other nodes as well, in some of these types of nodes etc. Further, admission control arrangements 11. may be implemented in 3GPP specific nodes handling payload as well.

Figure 11:
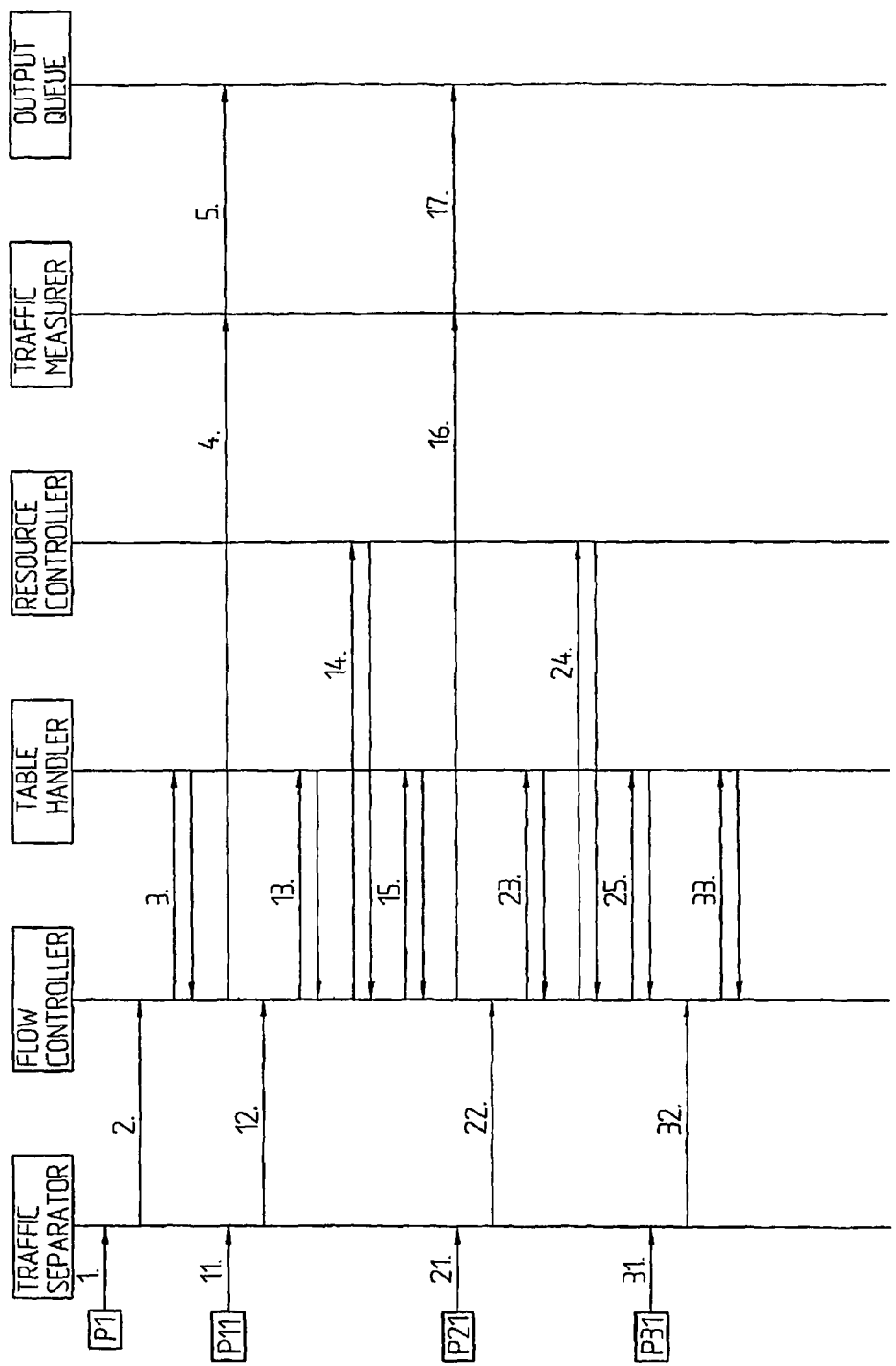
FIG. 11 is a sequence diagram illustrating the flows in one embodiment of the present invention, FIG. 12 schematically illustrates a flow diagram describing one example of the inventive procedure and the forwarding engine part of the example, and FIG. 13 schematically illustrates a flow diagram describing the Table Maintenance Process part of the example in FIG. 12.

Generally the ACMs ($11_1, \ldots,$) are provided on IP level in routing functions in the nodes, here e.g. in RNC (Radio Network Controll) 202, SGSN (Serving GPRS Support Node) 203, GGSN (Gateway GSN) 204, MRF (Media Resource Function) 205, (S)BG (Session) Boarder Gateway 206. In FIG. 11 is also illustrated a UE (User Equipment) 201 accessing the domain over a RAN (Radio Access Network). In some implementations it may e.g. be implemented in MSCs (Mobile Switching Centers) etc. It should be clear that FIG. 7 only is intended to show some examples of where the functionality according to the invention may be implemented.

In FIG. 8 one embodiment of an information holding means implemented as an extended forwarding table is schematically illustrated (although it of course may be implemented as a separate table as well). In FIG. 8 the fields that are provided in the external forwarding table are illustrated. The fields are, in one implementation, destination/source/protocol /D-port/S-port (here it contains the whole 5-tuple), a grant/disallow flag, a packet counter, and a time stamp with creation time. In some implementations, a field denoted previous packet counter is provided as well. Hence, each new entry has here the 5-tuple, a grant/disallow flag, a packet counter and a time stamp with creation time for the new flow and a counter for the previous packet.

A router including the functionality according to the present invention needs to have two activities going on in parallel, the forwarding engine and a table maintenance process. Both these processes need access to the extended forwarding table (if such is used). The forwarding engine needs to read the table to make lookups on source/destination address (or 3-tuples, 5-tuples etc.), it needs to update the timestamp, it needs to increase the packet counter for the found entry, and it needs to be able to insert new entries into the table (and remove entries).

Figure 9:
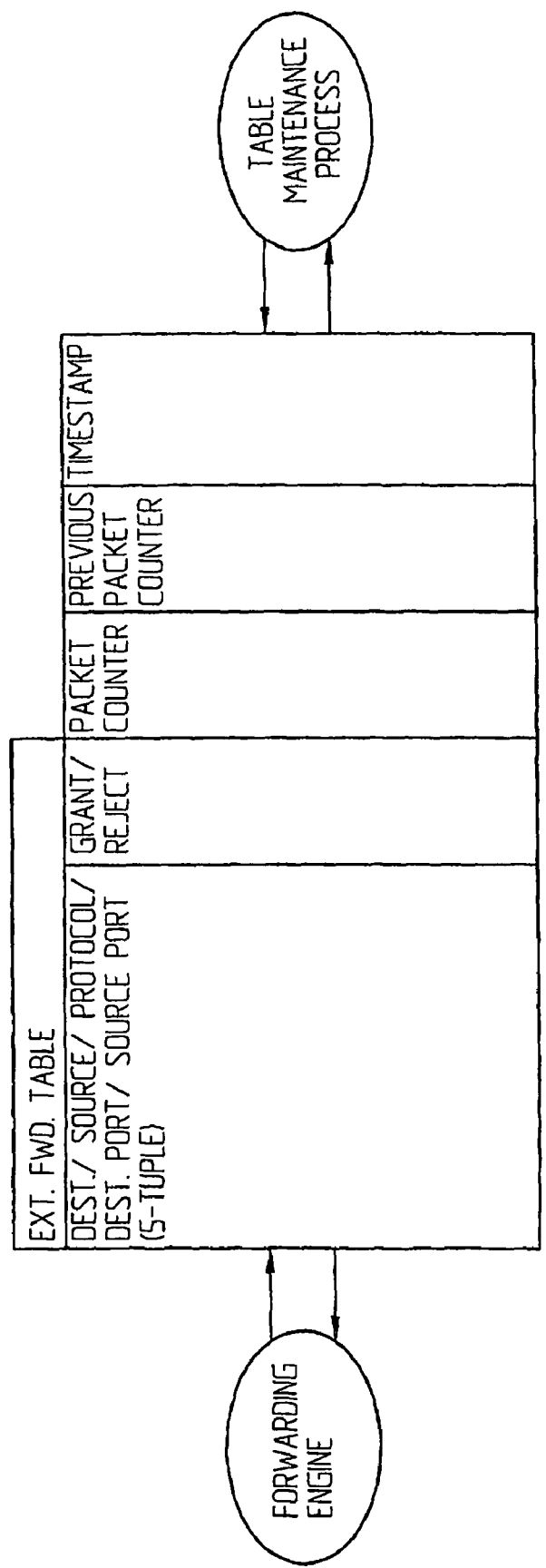
FIG. 9 shows an example of an extended forwarding table on which two processes are operating.

This is schematically illustrated in FIG. 9 where the two processes are illustrated as operating on the extended forwarding table of FIG. 8. The main task of the table maintenance process is to remove entries, which have become too old. When no more packets are transmitted in a flow (in both directions), i.e. all packets of a flow have been transmitted, that flow needs to be removed from the table to enable new flows to be admitted through the router, or whatever is the arrangement implementing the inventive concept, i.e. release resources of the router.

Since real-time flows "behave well", i.e. they have a substantially constant packet rate, with a constant time between packets, except for jitter, it should be easy to identify, with some precision, when a flow has stopped or ceased. Actually it does not do much harm if the wrong decision is taken for a small fraction of the flows, because then a new entry for the flow is just created in the normal way.

In state-of the art implementations, real-time flows carrying voice (e.g. a VoIP telephony call) often use silence suppression. That is, in a dual party call most often it is only one person speaking at a time. The voice codecs can then stop sending packets in one of the directions when that person is listening and is silent. If such a silence period becomes long, that is, longer than the time set for removing flows in AFAC enabled routers, special consideration must be taken not to lose the resource reservation in AFAC routers (etc) along the path of the flow. The end-host that does silence suppression must then send "refreshment packets" to keep the resources for the flow reserved. A refreshment packet must be sent at least with such a frequency that the timer for removing flows in the AFAC routers (etc) never is reached.

The table maintenance process, cf. FIG. 9, may for example operate as follows. It can read the extended forwarding table sequentially and in a cyclic way. When it comes to the end, it starts from the beginning again, possibly with a waiting period before it start the next scan. If for example one second is considered sufficient to identify a ceased flow (i.e. terminated call), the process scans through the table once every second. It should be clear that this is merely a figure given for illustrative purposes and it may be more frequently or less frequently then once every second as well. During one scan, when it checks an entry, it first checks the grant/disallow flag. If the disallow flow is set, it checks the creation time stamp. If more than a certain time has passed, the flow-blocking-time, for example 5 seconds, the entry is removed. Again, it should be clear that a shorter as well as a longer flow-blocking-time than 5 seconds may be used, for example 3 or 4 or 7 or 8 or 9 etc. or even shorter or even longer. Otherwise nothing more is done. If the disallow flag is not set, i.e. the flow is granted, the two packet counters, packet counter and previous packet counter, are compared. If equal, the entry is removed, i.e. the flow has stopped. If on the other hand they are not equal, the value of the packet counter is copied to the previous packet counter and the scanning continues with the subsequent entry in the table etc. In that manner the extended forwarding table will always be up-to-date with all flows that are currently passing through the router (here).

In one embodiment the forwarding engine and the table maintenance process are implemented as separate hardware using a shared memory. It should be possible to implement both in a standard CPU environment or alternatively in a dedicated hardware, e.g. ASIC environment or in a mixed environment. Given the limited and specific operations each process is doing on the extended forwarding table, the shared memory handling is advantageously implemented in an efficient way. In one advantageous implementation a Content Addressable Memory (CAM) is used for the shared memory. Alternatively it is implemented as a cache together with the dedicated hardware. The size of the required memory depends on the size of each entry and on the number of simultaneous flows through the router.

The insertion of new entries that are identified by the forwarding engine may be done by the table maintenance process using signalling from the forwarding engine to the table maintenance process in order to make the implementation of the shared memory handling more efficient. It should be clear that this merely relates to one advantageous implementation.

Preferably the table maintenance process also maintains an admission allowed flag, which is used by the forwarding engine. The flag is set to "no" when the maximum allowed simultaneous real-time flows through the router (or interface/link etc.) has been reached. The flag shall be set to "yes" when the number of simultaneous flows is lower than the flow limit or drops below the flow limit.

As discussed earlier, the flow limit can be defined in different ways. It may be defined or set internally but it may also be set from an external operation and maintenance node or a management system or a policy server in networks which are operated in a more advanced way. One simple implementation which gives a close to optimal usage of resources in the router consists in monitoring the resource utilization in the router (or interface/link etc.), compare to the current total number of flows in the extended forwarding table (or some separate information holding means). This can be repeated periodically with a given frequency, and the maximum limit can be obtained, which would adapt to changed average bitrates of the real-time flows. A certain amount of VoIP flows would for example consume less bandwidth than the same amount of high-resolution video flows. A router implemented for example as discussed above, will give a higher forwarding capacity and the delay is affected in a negligible way.

Figure 10:
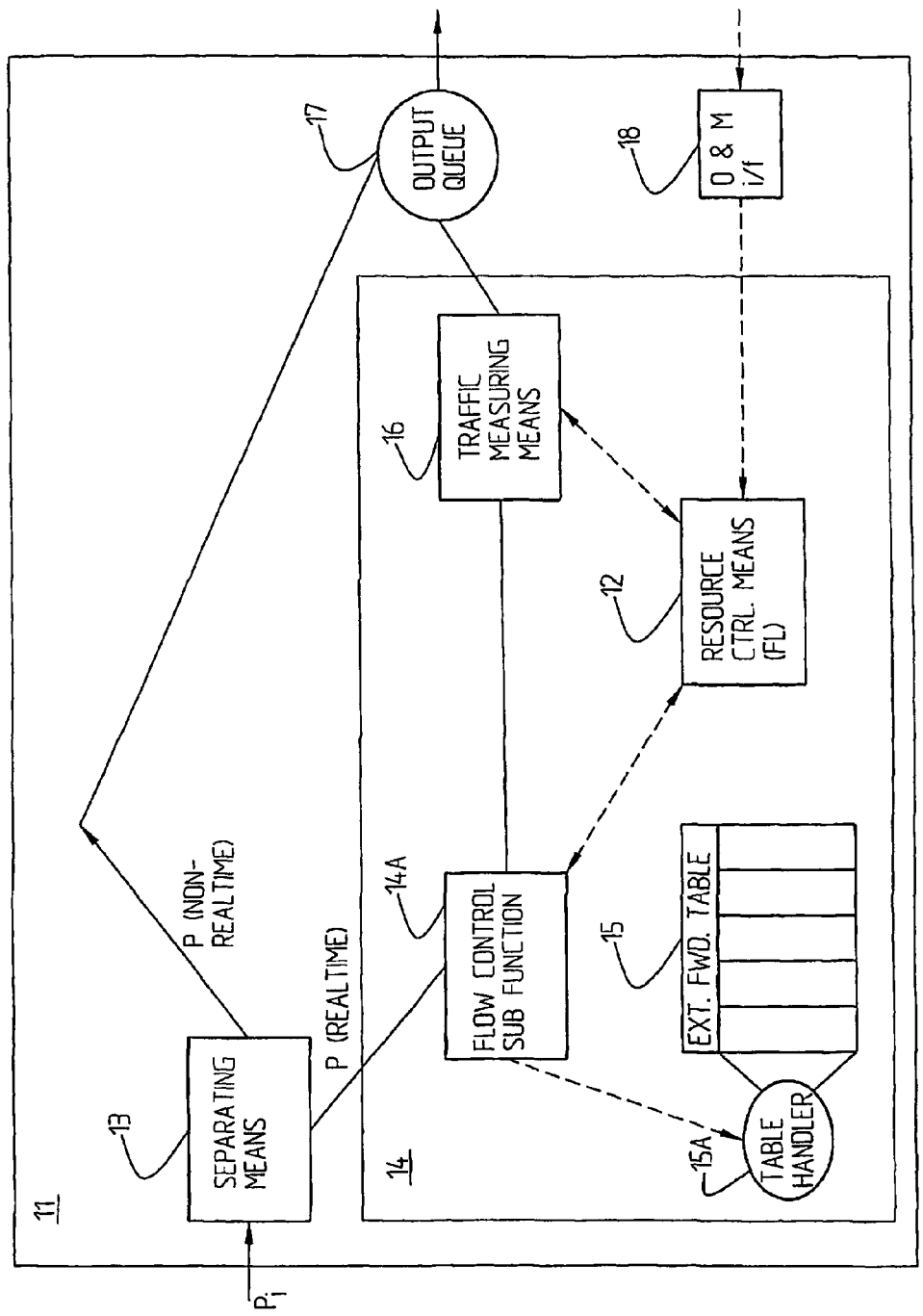
FIG. 10 shows an example of an arrangement according to the invention with information holding means implemented as an extended forwarding table.

FIG. 10 shows an arrangement according to one specific embodiment of the invention. The flow admission control arrangement 11 as implemented in the embodiment of FIG. 10 comprises separating means 13 for separating real-time traffic packets from non-real-time traffic packets, i.e. $P_i$ is taken to mean real-time as well as non-real-time packets. Identifying means are preferably, but not necessarily incorporated in the separating means; how identification between the different types of packets can be done in different manners as discussed earlier in the application, e.g. based on some marking (e.g. DiffServ) or indication. As can be seen, non-real-time packets are handled separately after the separation step. Here it is supposed that a logical or virtual separation is implemented. The flow control means 14 comprises a sub-function 14A for clarifying the packet, i.e. determining to which flow it belongs, e.g. based on 2-tuple, 3-tuple etc. Via table handler 15A it is examined through communication with the flow information holding means 15, here implemented as an extended forwarding table, whether it is a new or a current (existing) flow. The different possible procedures are e.g. explained with reference to FIG. 11 below. For all admitted packets, of a new or of a current flow, counters are increased by means of the table handler. The sub-function, traffic measuring means 16, measure the total admitted real-time traffic. The resource control means 12 provides information about flow limit (FL) which may be set internally or via external means as discussed earlier in the application. Generally the resource control means 12 are only involved in case of new flows, but they may also function such as to control admissibility by comprising FL and current flows, or needed to set, a flow limit may be obtained over an O&M interface 18, or internally.

The sequence diagram shown in FIG. 11 shows, according to one particular implementation of the present invention, four different cases, namely the procedure (I) when a packet of an established flow (here P1) arrives, the procedure (II) when forwarding a packet (here P11) of a new flow, the procedure (III) of dropping a packet (here P21) of a new flow, when there are no resources left, and finally the procedure (IV) of dropping a packet (here P31) of a previously registered flow.

Forwarding of a packet for an established flow: A packet P1 arrives to a traffic separator sub-function and is classified either as a real-time or a non-real-time traffic packet. Classification is e.g. based on DSCP. Here P1 is found to be a real-time packet and P1 therefore is sent to the flow controller sub-function. The flow controller sub-function classifies what flow P1 belongs to using the tuple that defines flows (2-tuple, 3-tuple, 5-tuple etc.). It then checks with a table handler to see if this is an existing flow or a new flow. The table handler sub-function checks if the flow is existing, and if it is, it increases a packet counter and a time-stamp. It then returns an acknowledge to the flow controller. The flow controller then admits P1 and forwards it to a traffic measurer sub-function. The traffic measurer sub-function increases any counters to keep track of total amount of real-time traffic and puts the packet on the output queue.

Forwarding of packet of a new flow: A packet P11 arrives to the traffic separator sub-function and is classified as real-time or non-real-time. Classification is e.g. based on DSCP. P11 is found to be a real-time packet and it is therefore sent to the flow controller sub-function. The flow controller sub-function classifies what flow P11 belongs to using the tuple that defines flows (2-tuple, 3-tuple, 5-tuple etc.). It then checks with a table handler to see if this is an existing flow or a new flow. The table handler sub-function checks the flow and finds that it is not a current flow, i.e. it does not previously exist. It then returns a negative acknowledge to the flow controller, indicating that the flow did not exist. The flow controller checks with a resource controller whether a new flow may be admitted or not, i.e. if there are sufficient resources for a new flow. The resource controller uses any means it has been implemented to use to decide the current level and max level of resource utilization. A reply with an "admit" or "drop" decision is returned to the flow controller. When resources are available, the flow controller requests the table handler to insert a new entry for the flow into the extended forwarding table. The flow controller then admits the packet and forwards it to the traffic measurer sub-function. Traffic measurer sub-function increases any counters to keep track of the total amount of real-time traffic and puts P11 on the output queue.

Dropping of packet for a new flow when no resources are left: A packet P21 arrives to the traffic separator sub-function and is classified as real-time or non-real-time. Classification is e.g. based on DSCP. P21 is found to be a real-time packet and P21 is therefore sent to the flow controller sub-function. The flow controller sub-function classifies what flow P21 belongs to using the tuple that defines flows (2-tuple, 3-tuple, 5-tuple etc.). It then checks with the table handler to see if this is an existing flow or a new flow. The table handler sub-function checks the flow and finds that is not a current flow, it does not previously exist. It then returns a negative acknowledge to the flow controller, indicating that the flow did not exist. The flow controller checks with the resource controller whether a new flow may be admitted or not, i.e. if there are sufficient resources for a new flow. When no resources are left a reply with a "drop" decision is return to the flow controller. When no resources are available the flow controller discards P21. If there are means for it the flow controller sub-function indicates the dropped session back to the sender of the packet, otherwise the packet is just silently discarded. The flow controller also requests the table handler to insert a new entry for the denied flow into the extended forwarding table. That way additional packets of this flow may be dropped more quickly.

Dropping of packet for a previously denied flow: A packet P31 arrives to the traffic separator sub-function and it is classified in either real-time or non-real-time. Classification is e.g. based on DSCP. P31 is found to be a real-time packet and it is therefore sent to the flow controller sub-function. The flow controller sub-function classifies what flow P31 belongs to using the tuple that defines flows (2-tuple, 3-tuple, 5-tuple etc.). It then checks with the table handler to see if this is an existing flow or a new flow. The table handler sub-function checks the flow and finds that it exists but was previously denied. It then returns this information back to the flow controller. The flow controller silently discards the packet.

The procedure according to the inventive concept will now be briefly discussed with reference to the flow diagrams of FIGS. 12 and 13. It should be clear that the Figures merely show exemplary ways of carrying out the inventive concept.

Figure 12:
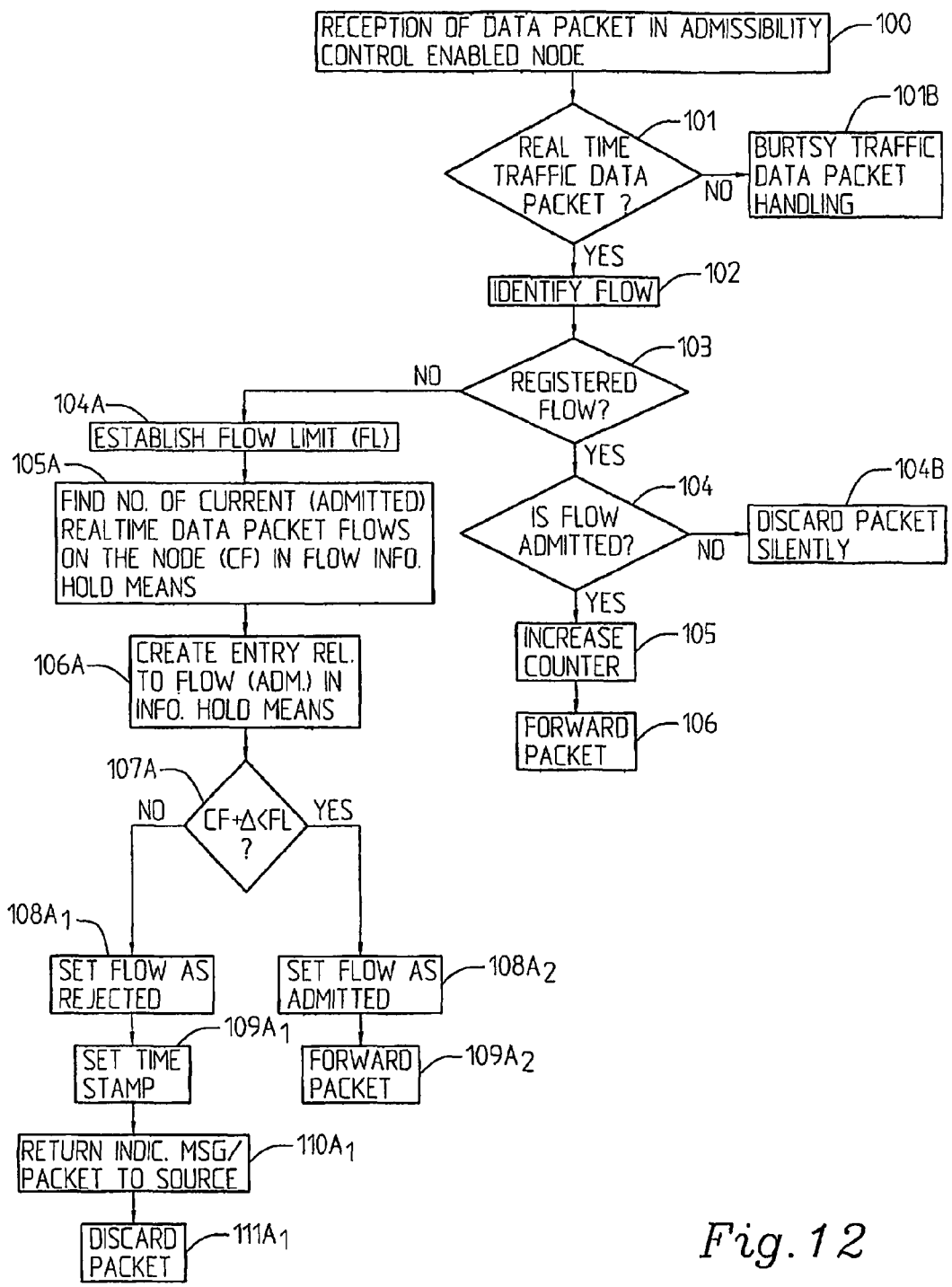

It is hence in FIG. 12 supposed that a data packet is received in an admissibility control enabled node according to the present invention, 100. As referred to earlier in the application the node may be a router or a GGSN etc. It is then examined if it is a real-time traffic data packet, 101. If not, i.e. if it is a bursty traffic data packet, it is handled separately from the real-time traffic, 101B, and this will not be further discussed. In other words here a separation is done between real-time and non-real-time data packet traffic. However, supposing it was a real-time traffic data packet, a flow identification is performed, 102. This will also not be further discussed here since it can be done in many different manners as described more thoroughly earlier in the application, for example based on source address and destination address or the 5-tuple. Then it is checked if the flow is a current admitted or non-admitted flow (registered flow) i.e. it has an entry in the flow information holding means, 103. If it is, examined if, it is an admitted flow, 104. If yes, then the packet counter is increased, 105, and the packet is forwarded, 105, whereas non-admitted packets are silently discarded, 104B. If it is not a current flow, then the flow limit FL is established (subsequently or simultaneously), 104A. This can also be done in several ways as also discussed earlier in the application, i.e. the maximum number of flows that can be admitted simultaneously on the node at a moment in time. Subsequently or simultaneously or before step 104A, the number of current admitted real-time data packet flows in the node, also denoted CF, is found through checking with the flow information holding means, e.g. an extended forwarding table or a separate table as also discussed earlier in the application, 105A, or by checking with the Traffic Measuring Means. An entry is created in the flow information holding means for the entry. Next step is to check if the new flow shall be marked as an admitted or non-admitted flow. This is established by checking if CF+$\Delta$, $\Delta$ being an estimated margin in order to prevent congestion and lost packets etc., is (equal to or) less than FL, 107A. If yes, the flow is marked as admitted, $108A_2$, and the packet is forwarded, $109A_2$. If no, the flow is marked as non-admitted or rejected, $108A_1$. The time-stamp is set to enable a flow blocking time to be kept, $109A_1$. Alternatively the second packet counter is set and used for non-admitted flows to establish a flow blocking time. The second packet counter is then increased once every scan by the Table Maintenance Process, and the entry removed when the second counter reaches a predefined value, which corresponds to the flow blocking time. Further, in this particularly implementation an indication message or packet is returned to the source or the sending node, $110A_1$. The packet is then discarded, $111A_1$.

Figure 13:
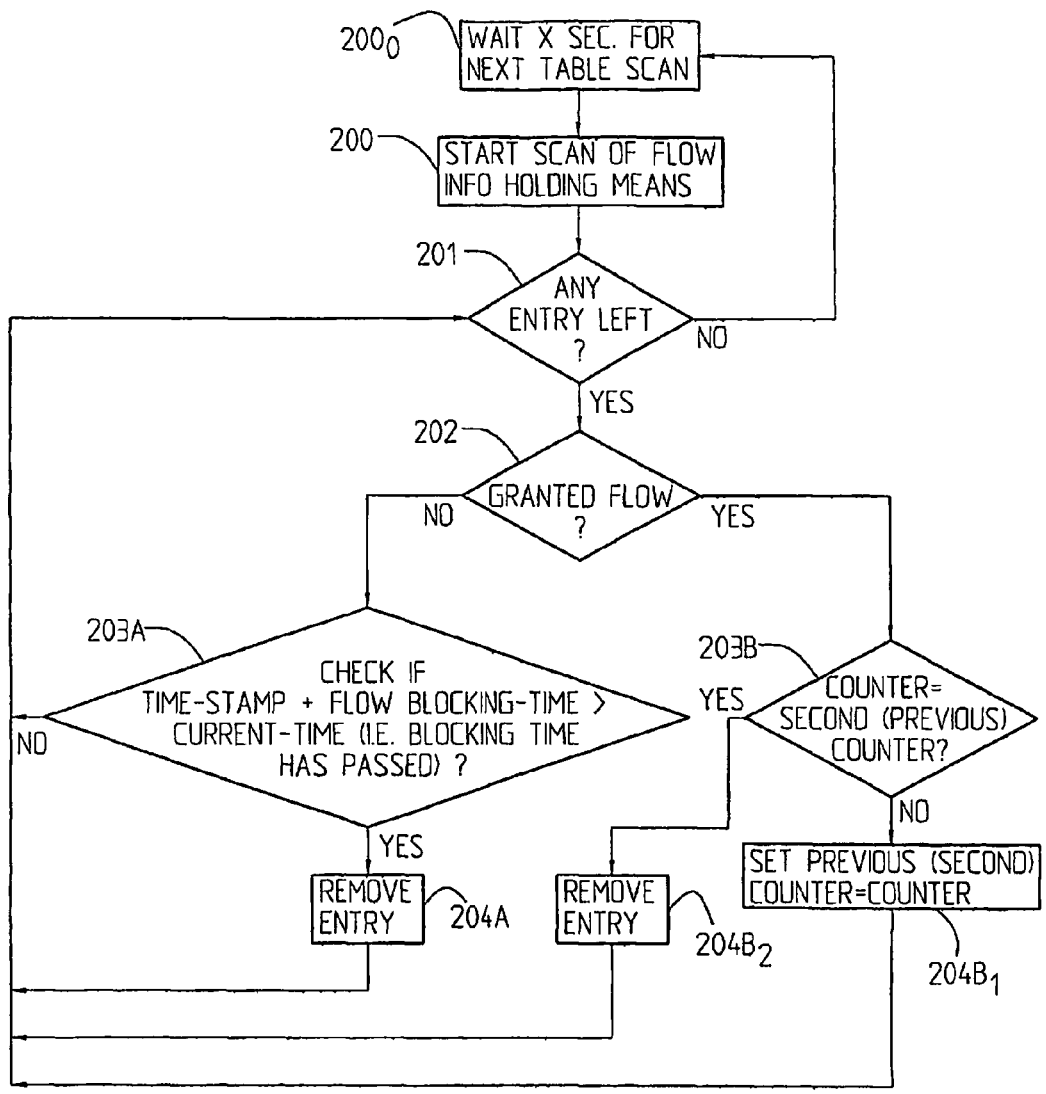

In FIG. 13 the inventive concept is further briefly described. It is the Table Maintenance Process part which has the task to remove flows from the flow information holding means. Admitted flows are removed a predefined time after the last packet has been sent for a flow. Non-admitted or rejected flows are removed when the flow blocking time has expired.

The Table Maintenance process scans through all entries in the flow information holding means once every predefined number of seconds. After a scan it may need to wait x seconds for next scan before next scan starts. When the scan starts, 200, all entries are checked one by one. When no more entries are left, it waits for next scan to start, $200_0$. For each entry (left, 201) it is checked if it is admitted or not, 202. If it is admitted, it is in this implementation using secondary packet counters, checked if the packet counter is equal to the second (or previous) packet counter, 203B. If they are equal, no packets have been forwarded since the last scan was done, and hence the flow may be regarded as stopped. The entry is then removed, $204B_2$. If the counters are not equal, packets have been forwarded since last scan. Then the secondary (or previous) packet counter is set equal to the packet counter, $204B_1$. The scan continues with next entry in the flow information holding means, i.e. it is examined if there is any entry left etc, 201.

If the flow entry on the other hand was a non-admitted flow, the timestamp is checked to see if the flow blocking time has passed, 203A. If it has the entry is removed, 204A. The scan continues with next entry in the flow information holding means, or examines if there is any entry left, 201.

It is an advantage of the invention that routers, nodes etc. equipped with arrangements according to the invention will be able to handle real-time traffic in a very advantageous way. When the router, if the arrangement is implemented in a router, becomes overloaded, either all packets will be dropped for a flow, or none of the packets will be dropped. This means that some flows are granted and some flows are stopped completely. This is very advantageous.

It is another advantage of the invention that resources can be reserved end-to-end in a very simple way, it is simply started to send the flow, or a probing packet is sent back and forth (or some probing packets). If it is successful, i.e. it returns (in case of a probing packet) then resources will be maintained throughout the lifetime of the flow. If there is a failure, i.e. the probing packet does not get through and for example an ICMP is returned or if it is in some other way detected that there is a failure (e.g. indirectly), no packets will be let through and the call has experienced blocking in a similar way as in traditional telephony. It is also an advantage that it works end-to-end and particularly it is an advantage that no signalling is required for setting up end-to-end QoS. Still another advantage is that it works with Voice over IP as well as Video over IP and flows can have an arbitrary bitrate as well as flows with different bitrates can be mixed. In addition thereto the concept is compatible with existing IP technology and it allows for smooth migration and networks can be upgraded stepwise. Still further it can be standardized or it can be implemented as a proprietary solution and since it works autonomously, it does not impose any particular requirements on other equipment in the network.

According to the invention real-time and bursty traffic is separated (physically or virtually) or at least kept separate in the parts of the network where real-time QoS must be ensured.

It should be clear that the invention of course not is limited to the specifically illustrated embodiments, but that it can be varied in a number of ways within the scope of the appended claims.

The invention claimed is:

1. An arrangement for controlling communication of data packets through one or more communication networks or network domains having an identifying means for identifying real-time or non-bursty data packet traffic and a separating means for separating real-time data packet traffic from bursty data packet traffic, the arrangement, being arranged in a node, comprising:
- autonomous, flow-based admission control means for controlling the admission of real-time data packets;
- a flow admittance capacity indicating means, wherein the autonomous, flow-based admission control means is in communication with the flow admittance capacity indicating means, adapted to keep information about the amount of real-time data packet flows that is admissible in the node;
- a flow information holding means adapted to hold information about the current number of admitted and/or non-admitted real-time data packet flows, the flow admittance capacity indicating being in communication with the flow information holding means; and
- the autonomous, flow-based admission control means adapted to detect whether an arriving packet belongs to a current admitted flow, and then to admit the packet, and being further adapted to, if the packet does not belong to a current admitted flow, verify with the flow admittance capacity indicating means if there is capacity left such that the new flow can be accepted, and if so, then to admit the packet, and in that it is adapted to, if there is no capacity left, reject the packet.

2. The arrangement according to claim 1, further comprising a separating means adapted to separate real-time or non-bursty traffic and bursty traffic.

3. The arrangement according to claim 2, wherein the separating means is adapted to separate real-time IP flows and bursty IP traffic by using separate links, separate interfaces, or separate routers, at least on one or more parts of the network(s) or network domain(s).

4. The arrangement according to claim 3, wherein the real-time traffic and bursty traffic are separated from one end point to another end point.

5. The arrangement according to claim 4, wherein the real-time traffic and bursty traffic is separated at least from one aggregation node.

6. The arrangement according to claim 5, wherein the real-time traffic and bursty traffic is separated at least from one aggregation router to another aggregation node or to an end point.

7. The arrangement according to claim 2, wherein the real-time traffic and bursty traffic is separated at least from one aggregation node.

8. The arrangement according to claim 7, wherein the real-time traffic and bursty traffic is separated at least from one aggregation router to another aggregation node or to an end point.

9. The arrangement according to claim 2, wherein the separating means are adapted to logically separate real-time or non-bursty traffic and bursty traffic.

10. The arrangement according to claim 9, further comprising marking means for marking of IP packets.

11. The arrangement according to claim 10, wherein the marking means is for marking of IP packets through diffsery DSCP marking.

12. The arrangement according to claim 9, wherein a DiffSery scheduler is used for marking/separating real-time packets from packets classified as bursty traffic and further wherein common nodes, links and routers are used for real-time as well as for bursty traffic, at least through a part of the network(s) or network domains.

13. The arrangement according to claim 1, wherein the OoS class of PDP contexts is used as a basis for separation.

14. A method in a node for controlling communication of data packets in a communication network consisting of one or more intercommunicating networks or network domains, comprising the steps of:
- identifying data packets of real-time or non-bursty IP data flows; separating real time IP data packet traffic from bursty data packet traffic; and
- establishing autonomously, in an admissibility control arrangement provided in the node, the admissibility of real-time IP data packet flows by establishing or estimating the amount of real-time data packet flows that can be handled and setting a flow limit;
- establishing, in the admissibility control arrangement in the node, the number of current, admitted, real time data packet flows;
- detecting whether an arriving data packet belongs to a current flow, or is packet belonging to a new data packet flow;
- accepting and forwarding data packets belonging to current admitted flows;
- examining, for a packet belonging to a new data packet flow, whether there is capacity left for the new flow, and if so;
- admitting the data packet, and if not;
- rejecting the data packet.

15. The method of claim 14, wherein the detecting step further comprises the steps of: detecting if an arriving packet belongs to an already rejected or non-admitted flow and, if so, rejecting the packet.

16. The method according to claim 15, further comprising the step of returning an indication message, if a packet is the first packet of a data packet flow that is rejected, to a preceding node or to the source from where the packet originated.

17. The method according to claim 14, further comprising the step of returning an indication message, if a packet is the first packet of a data packet flow that is rejected, to a preceding node or to the source from where the packet originated.

* * * * *

UNITED STATES PATENT AND TRADEMARK OFFICE
CERTIFICATE OF CORRECTION

PATENT NO.       : 8,068,422 B2
APPLICATION NO.  : 11/995281
DATED            : November 29, 2011
INVENTOR(S)      : Ronneke It is certified that error appears in the above-identified patent and that said Letters Patent is hereby corrected as shown below:

In Column 1, Line 24, delete "much," and insert -- much traffic. --, therefor.

In Column 1, Line 53, delete "IntSery" and insert -- IntServ --, therefor.

In Column 6, Line 49, delete "BRIEF" and insert -- DETAILED --, therefor.

In Column 8, Line 33, delete "100," and insert -- 10C --, therefor.

In Column 8, Line 37, delete "100," and insert -- 10C, --, therefor.

In Column 8, Line 52, delete "diffsery" and insert -- diffserv --, therefor.

In Column 10, Line 47, delete "1OF" and insert -- 10F --, therefor.

In Column 10, Line 54, delete "1OF" and insert -- 10F --, therefor.

In Column 13, Line 21, delete "11." and insert -- $11_x$ --, therefor.

In Column 17, Line 49, delete "CFA+Δ," and insert -- CF+Δ, --, therefor.

In Column 20, Line 7, in Claim 11, delete "diffsery" and insert -- diffserv --, therefor.

In Column 20, Lines 9-10, in Claim 12, delete "DiffSery" and insert -- DiffServ --, therefor.

In Column 20, Line 15, in Claim 13, delete "OoS" and insert -- QoS --, therefor.

Signed and Sealed this
Seventeenth Day of April, 2012

David J. Kappos
*Director of the United States Patent and Trademark Office*